US011928002B2

(12) United States Patent
Zhou et al.

(10) Patent No.: US 11,928,002 B2
(45) Date of Patent: Mar. 12, 2024

(54) DATA TRANSMISSION METHOD, APPARATUS AND SMART WATCH DEVICE

(71) Applicant: MOBVOI INFORMATION TECHNOLOGY COMPANY LIMITED, Beijing (CN)

(72) Inventors: Wenjie Zhou, Beijing (CN); Bo Zhang, Beijing (CN); Yuanyuan Li, Beijing (CN)

(73) Assignee: Mobvoi Information Technology Company Limited, Beijing (CN)

( * ) Notice: Subject to any disclaimer, the term of this patent is extended or adjusted under 35 U.S.C. 154(b) by 90 days.

(21) Appl. No.: 17/749,597

(22) PCT Filed: Nov. 24, 2020

(86) PCT No.: PCT/CN2020/131167
§ 371 (c)(1),
(2) Date: May 20, 2022

(87) PCT Pub. No.: WO2021/104267
PCT Pub. Date: Jun. 3, 2021

(65) Prior Publication Data
US 2023/0161397 A1 May 25, 2023

(30) Foreign Application Priority Data

Nov. 27, 2019 (CN) .......................... 201911179163.X
Nov. 27, 2019 (CN) .......................... 201911179285.9

(51) Int. Cl.
*G06F 1/3234* (2019.01)
*G06F 1/16* (2006.01)
(Continued)

(52) U.S. Cl.
CPC .............. *G06F 1/325* (2013.01); *G06F 1/163* (2013.01); *G06F 1/1698* (2013.01);
(Continued)

(58) Field of Classification Search
CPC ........ G06F 1/325; G06F 1/163; G06F 1/1698; G06F 1/3209; G06F 1/3278; H04W 4/80; Y02D 30/70
See application file for complete search history.

(56) References Cited

U.S. PATENT DOCUMENTS 9,625,969 B2 *  4/2017  Kim ...................... G06F 1/3209
2004/0152495 A1  8/2004  Choi
(Continued)

FOREIGN PATENT DOCUMENTS

CN        1168501 A      12/1997
CN     201252572 Y       6/2009
(Continued)

OTHER PUBLICATIONS

International Search Report and Written Opinion for PCT/CN2020/131167, dated Mar. 6, 2021.

*Primary Examiner* — Glenn A. Auve
(74) *Attorney, Agent, or Firm* — Andrus Intellectual Property Law, LLP (57) ABSTRACT

Embodiments of the present disclosure provide a data transmission method, apparatuses, and a smart watch device. A first BLE module of a first MCU of a smart watch receives an instruction of transmitting data which includes an instruction of transmitting the data to an AP of the smart watch or a mobile terminal. The first BLE module determines whether the AP is in a wake-up state if the instruction is to transmit the data to the AP, and transmits the data to a second BLE module of the AP through a RFCOMM interface if the AP is determined to be in the wake-up state, otherwise, buffers the to-be-transmitted data. The first BLE module synchronizes state information to the second BLE module if the instruction is to transmit the data to the mobile terminal, and transmits the data to the mobile terminal through the RFCOMM interface.

8 Claims, 9 Drawing Sheets

(51) Int. Cl.
*G06F 1/3209* (2019.01)
*H04W 4/80* (2018.01)

(52) U.S. Cl.
CPC .......... *G06F 1/3209* (2013.01); *G06F 1/3278* (2013.01); *H04W 4/80* (2018.02); *Y02D 30/70* (2020.08)

(56) References Cited

U.S. PATENT DOCUMENTS

| | | | |
|---|---|---|---|
| 2017/0242473 A1 | 8/2017 | Bostick et al. | |
| 2017/0244644 A1* | 8/2017 | Lee | ........................ H04L 47/32 |
| 2019/0075521 A1* | 3/2019 | Kneckt | ............. H04W 52/0229 |

FOREIGN PATENT DOCUMENTS

| | | | |
|---|---|---|---|
| CN | 102036349 | A | 4/2011 |
| CN | 104503691 | A | 4/2015 |
| CN | 105094816 | A | 11/2015 |
| CN | 105404378 | A | 3/2016 |
| CN | 105408835 | A | 3/2016 |
| CN | 105589336 | A | 5/2016 |
| CN | 105681429 | A | 6/2016 |
| CN | 105744606 | A | 7/2016 |
| CN | 105872976 | A | 8/2016 |
| CN | 106658365 | A | 5/2017 |
| CN | 106873753 | A | 6/2017 |
| CN | 107126202 | A | 9/2017 |
| CN | 108319360 | A | 7/2018 |
| CN | 110955323 | A | 4/2020 |
| IN | 105388748 | A | 3/2016 |
| IN | 110891259 | A | 3/2020 |
| WO | 2018195923 | A1 | 11/2018 |

\* cited by examiner

Fig. 1

Receiving, by a first BLE module of a first MCU of the smart watch, an instruction of transmitting data, wherein the instruction of transmitting data comprises an instruction of transmitting the data to an AP of the smart watch or an instruction of transmitting the data to a mobile terminal — S210

Determining, by the first BLE module, whether the AP is in a wake-up state if the instruction of transmitting data is the instruction of transmitting the data to the AP, and transmitting the data to a second BLE module of the AP through a radio frequency communication RFCOMM interface if the AP is determined to be in the wake-up state, otherwise, buffering the to-be-transmitted data — S220

Synchronizing, by the first BLE module, state information to the second BLE module of the AP if the instruction of transmitting data is the instruction of transmitting the data to the mobile terminal, and transmitting the data to the mobile terminal through the RFCOMM interface — S230

DATA TRANSMISSION METHOD, APPARATUS AND SMART WATCH DEVICE

CROSS-REFERENCE TO RELATED APPLICATIONS

This application is a US National Phase Application of PCT Patent Application No. PCT/CN/2020/131167 filed on Nov. 24, 2020, claiming priority to Chinese Patent Application 201911179285.9, titled "BLUETOOTH LOW ENERGY (BLE) DATA TRANSMISSION METHOD AND APPARATUS FOR SMART WATCH", and Chinese Patent Application 201911179163.X, titled "SMART WATCH DEVICE", filed on Nov. 27, 2019, the disclosure of which are incorporated herein by reference in their entirety.

FIELD OF THE INVENTION

The present disclosure relates to the field of smart wearable devices, and in particular to, a data transmission method, apparatuses and a smart watch device.

BACKGROUND OF THE INVENTION

Currently, to improve the battery life of smart watches, some manufacturers have used a single-chip micro-controller unit (MCU) solution to save power. The single-chip MCU replace the smart operating system (OS) to perform some functions of the smart watch.

In such a solution, the smart watch still needs to wake up the smart OS frequently to perform the other functions, and therefore the power consumption of the smart watch is still high.

SUMMARY OF THE INVENTION

The present disclosure provides a data transmission method, apparatuses, and a smart watch device, to resolve or alleviate at least one of the foregoing problems.

According to an aspect of the embodiments of the present disclosure, a BLE data transmission method for a smart watch is provided and includes:
receiving, by a first BLE module of a first MCU of the smart watch, an instruction of transmitting data, where the instruction of transmitting data includes an instruction of transmitting the data to an application processor (AP) of the smart watch or an instruction of transmitting the data to a mobile terminal;
determining, by the first BLE module, whether the AP is in a wake-up state if the instruction of transmitting data is the instruction of transmitting the data to the AP, and transmitting the data to a second BLE module of the AP through a radio frequency communication RFCOMM interface if the AP is determined to be in the wake-up state, otherwise, buffering the to-be-transmitted data; and
synchronizing, by the first BLE module, state information to the second BLE module of the AP if the instruction of transmitting data is the instruction of transmitting the data to the mobile terminal, and transmitting the data to the mobile terminal through the RFCOMM interface.

Optionally, the instruction of transmitting data further includes an instruction of transmitting the data to a second MCU of the smart watch.

The method further includes:
transmitting, by the first BLE module, the data to the second MCU according to a data sharing protocol between the first MCU and the second MCU if the instruction of transmitting data is the instruction of transmitting the data to the second MCU.

Optionally, the method further includes:
verifying, by the first BLE module, validity of the data before transmitting the data through the RFCOMM interface.

Optionally, the method further includes:
encapsulating or parsing, by the first BLE module, the transmitted data.

Optionally, the determining, by the first BLE module, whether the AP is in a wake-up state includes:
determining, by the first BLE module, whether the AP is in the wake-up state according to a notification of a service run by the first MCU.

Optionally, the synchronizing, by the first BLE module, state information to the second BLE module of the AP includes:
synchronizing, by the first BLE module, the state information to the second BLE module of the AP in a pass-through manner through a custom interface provided by a library file.

According to another aspect of the embodiments of the present disclosure, a BLE module apparatus is provided and connected to the first MCU of the smart watch, and includes:
an instruction receiving module, configured to receive an instruction of transmitting data, where the instruction of transmitting data includes an instruction of transmitting the data to an AP of the smart watch or an instruction of transmitting the data to a mobile terminal;
a first processing module, configured to determine whether the AP is in a wake-up state when the instruction of transmitting data is the instruction of transmitting the data to the AP, and transmit the data to the AP through a RFCOMM interface if the AP is determined to be in the wake-up state, otherwise, buffer the to-be-transmitted data; and
a second processing module, configured to synchronize state information to a BLE module of the AP when the instruction of transmitting data is the instruction of transmitting the data to the mobile terminal, and transmit the data to the mobile terminal through the RFCOMM interface.

Optionally, the apparatus further includes:
a third processing module, configured to transmit the data to a second MCU according to a data sharing protocol between the first MCU and the second MCU when the instruction of transmitting data is the instruction of transmitting the data to the second MCU of the smart watch.

According to another aspect of the present disclosure, a MCU apparatus is provided and includes the foregoing BLE module apparatus.

According to another aspect of the present disclosure, a smart watch device is provided and includes an AP and the foregoing MCU apparatus.

According to another aspect of the present disclosure, a smart watch device is provided and includes:
an AP running a smart OS, a first function module, a second function module, a first MCU and a second MCU, where
the first MCU is configured to drive the first function module when the AP is in a sleep state; and
the second MCU is configured to drive the second function module when the AP is in the sleep state.

Optionally, the power consumption of the first MCU is lower than that of the second MCU, and the power consumption of the first function module is lower than that of the second function module.

Optionally, the first function module includes at least one of an Audio in module, a Mic module, a BLE module, a narrowband Internet of things (NB-IoT) module, a sensor module, and a battery gauge module; the second function module includes at least one of a Touch module, a KEY module, and a positioning module.

Optionally, when configured to drive the first function module, the first MCU is specifically configured to:
 drive the Audio in module and the Mic module to receive a voice command; and
 wake up the smart OS according to the voice command.

Optionally, when configured to drive the first function module, the first MCU is specifically configured to:
 drive the BLE module to acquire first information; and
 drive a first display module to display the first information.

Optionally, when configured to drive the first function module, the first MCU is specifically configured to:
 drive the NB-IoT module to acquire second information; and
 drive a first display module to display the second information.

Optionally, when configured to drive the first function module, the first MCU is specifically configured to:
 drive the sensor module to acquire sensing data; and
 drive a first display module to display the sensing data.

Optionally, when configured to drive the first function module, the first MCU is specifically configured to:
 drive the battery gauge module to acquire power data; and
 drive a first display module to display the power data.

Optionally, when configured to drive the second function module, the second MCU is specifically configured to:
 receive the acquired data transmitted by the first MCU; and
 drive the second display module to display the data acquired by the first function module.

Optionally, when configured to drive the second function module, the second MCU is specifically configured to:
 drive the Touch module to acquire touch information; and
 drive a second display module to display response content of the touch information.

Optionally, when configured to drive the second function module, the second MCU is specifically configured to:
 drive the KEY module to acquire key information; and
 drive a second display module to display response content of the key information.

Optionally, when configured to drive the second function module, the second MCU is specifically configured to:
 drive a positioning module to acquire position data; and
 process the position data and display a processing result on a second display module.

Optionally, after woken up, the AP is further configured to synchronize data generated by the first MCU and/or the second MCU during the sleep period of the AP.

According to the technical solution provided by the embodiments of the present disclosure, in the case that the MCU system and the smart OS coexist, the BLE module mounted on the MCU may communicate with the AP and synchronize the data generated during the sleep period of the AP when the AP is woken up or may replace the AP to directly transmit data to the mobile terminal when the AP sleeps and synchronize the relevant state information to the BLE module of the AP. After woken up, the AP can obtain the communication data between the BLE module mounted on the MCU and the mobile terminal during the sleep period of the AP. According to this solution, during the sleep period of the AP, the Bluetooth mounted on the MCU can operate independently, without waking up the AP, thereby reducing the power consumption of the smart watch.

BRIEF DESCRIPTION OF THE DRAWINGS

The accompanying drawings illustrate exemplary implementations of the present disclosure and, together with the description, are used to explain the principles of the present disclosure, which include the accompanying drawings to provide a further understanding of the present disclosure. The accompanying drawings are included in this specification and constitute a part of this specification.

PREFERRED EMBODIMENTS OF THE PRESENT INVENTION

Exemplary embodiments of the present disclosure are described below in detail with reference to the accompanying drawings. Although exemplary embodiments of the present disclosure are shown in the accompanying drawings, it should be understood that the present disclosure can be embodied in various forms and should not be limited by the embodiments described herein. On the contrary, these embodiments are provided such that the present disclosure is understood more thoroughly, and the scope of the present disclosure is fully conveyed to those skilled in the art.

In the general architecture design scheme of Bluetooth for the smart watch, the Bluetooth chip is bound to a smart OS to transmit data through Bluetooth. In some schemes, a single MCU system transmits data through Bluetooth in the absence of the smart OS. If the smart watch includes the MCU system and the smart OS, there is no solution to support the MCU system to transmit data through Bluetooth when the MCU system and the smart OS exist in parallel. As a result, the MCU of the smart watch cannot operate in the Bluetooth transmission scenario. The AP needs to be woken up and run the smart OS, which improves the power consumption of the smart watch.

Figure 1:
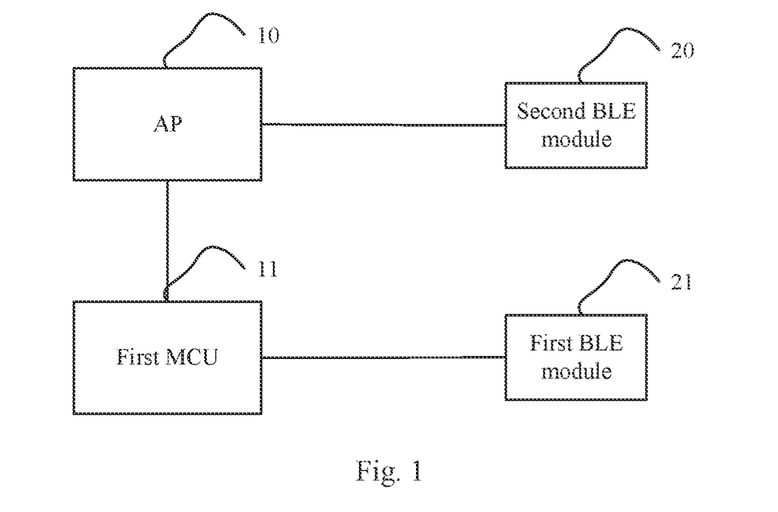
FIG. 1 is a structural block diagram of a smart watch device according to an embodiment of the present disclosure.

FIG. 1 is a structural block diagram of a smart watch device according to an embodiment of the present disclosure, including an AP 10, a first MCU 11, a second BLE module 20 connected to the AP 10, and a first BLE module 21 connected to the first MCU 11. The AP runs the smart OS to drive smart watch modules such as sensor module(s), battery gauge module(s), voice wake-up monitor module(s), Bluetooth module(s), liquid crystal display (LCD) screen module(s), organic light-emitting diode (OLED) screen module(s), touch screen module(s), KEY module(s) for UI interaction and the second BLE module 20. The first MCU 11, during the sleep period of the AP 10, can drive some of the modules such as the sensor module(s), the battery gauge module(s), the voice wake-up monitor module(s), and the LCD screen module(s). In addition, the first MCU 11 is individually configured with the first BLE module 21.

Figure 2:
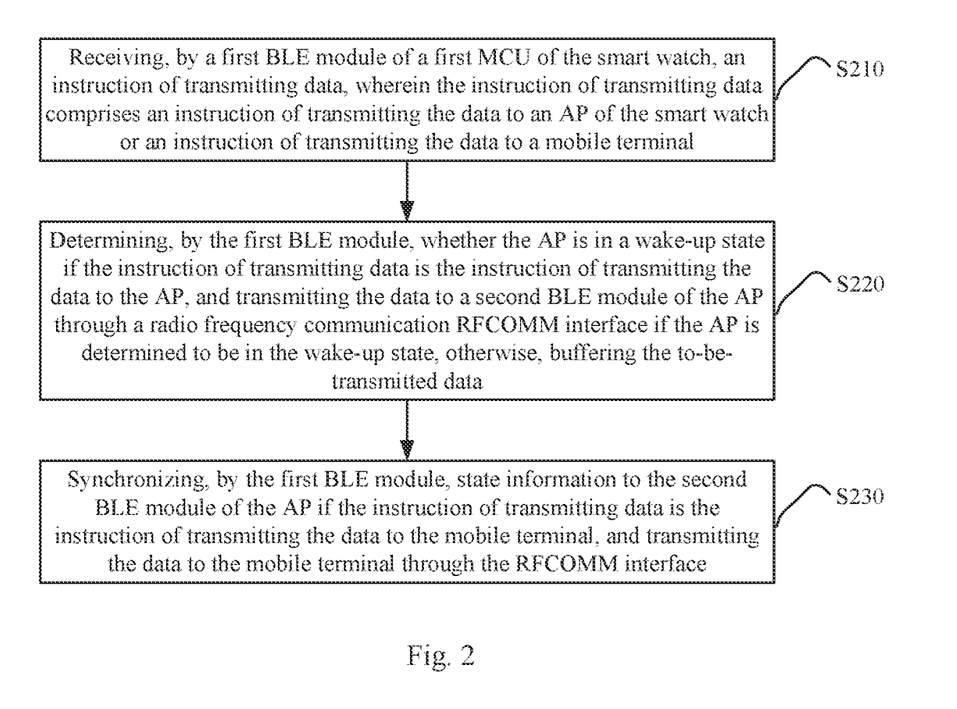
FIG. 2 is a flowchart of a BLE data transmission method of a smart watch according to an embodiment of the present disclosure.

According to the structural block diagram of the smart watch device shown in FIG. 1, the present disclosure provides a BLE data transmission method of a smart watch as shown in FIG. 2, including the following steps:

S210: The first BLE module 21 of the first MCU 11 receives an instruction of transmitting data, where the instruction of transmitting data includes an instruction of transmitting the data to the AP 10 or an instruction of transmitting the data to a mobile terminal;

S220: The first BLE module 21 determines whether the AP 10 is in a wake-up state if the instruction of transmitting data is the instruction of transmitting the data to the AP 10, and transmits the data to the second BLE module 20 of the AP 10 through a RFCOMM interface if the AP is determined to be in the wake-up state, otherwise, buffers the to-be-transmitted data; and S230: The first BLE module 21 synchronizes state information to the second BLE module 20 of the AP 10 if the instruction of transmitting data is the instruction of transmitting the data to the mobile terminal, and transmits the data to the mobile terminal through the RFCOMM interface.

According to the flowchart shown in FIG. 2, in the case that the MCU and the AP exist in parallel and mount the BLE modules separately, the BLE module mounted on the MCU may communicate with the AP and synchronize the data generated during the sleep period of the AP when the AP is woken up or may replace the AP to directly transmit data to the mobile terminal when the AP sleeps and synchronize the relevant state information to the BLE module of the AP. After being woken up, the AP can obtain the communication data between the BLE module mounted on the MCU and the mobile terminal during the sleep period of the AP. In this way, during the sleep period of the AP, the Bluetooth mounted on the MCU can operate independently, without waking up the AP, thereby reducing the power consumption of the smart watch.

Figure 3:
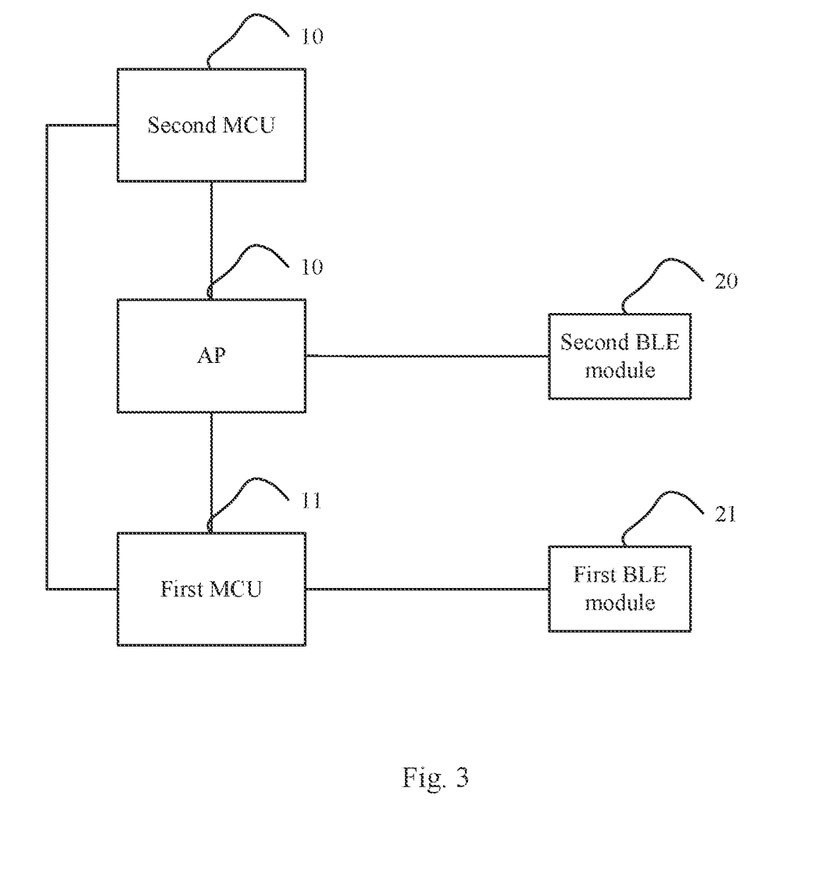
FIG. 3 is another structural block diagram of the smart watch device according to an embodiment of the present disclosure.

FIG. 3 is another structural block diagram of a smart watch device according to an embodiment of the present disclosure, including the AP 10, the first MCU 11, a second MCU 12, the second BLE module 20 connected to the AP 10 and the first BLE module 21 connected to the first MCU 11. Compared with the structure of the smart watch shown in FIG. 1, a module driven by the second MCU 12 added newly is different from that driven by the first MCU 11. For example, the first MCU 11 can drive the sensor module(s), the battery gauge module(s), the voice wake-up monitor module(s), BLE module(s), the LCD screen module(s) and the like. The second MCU 12 can drive the touch screen module(s), the OLED screen module(s), the key module(s) and the like. The two MCUs cooperate with each other. The demand for the AP is decreased when the use scenarios of the MCUs are expanded.

Figure 4:
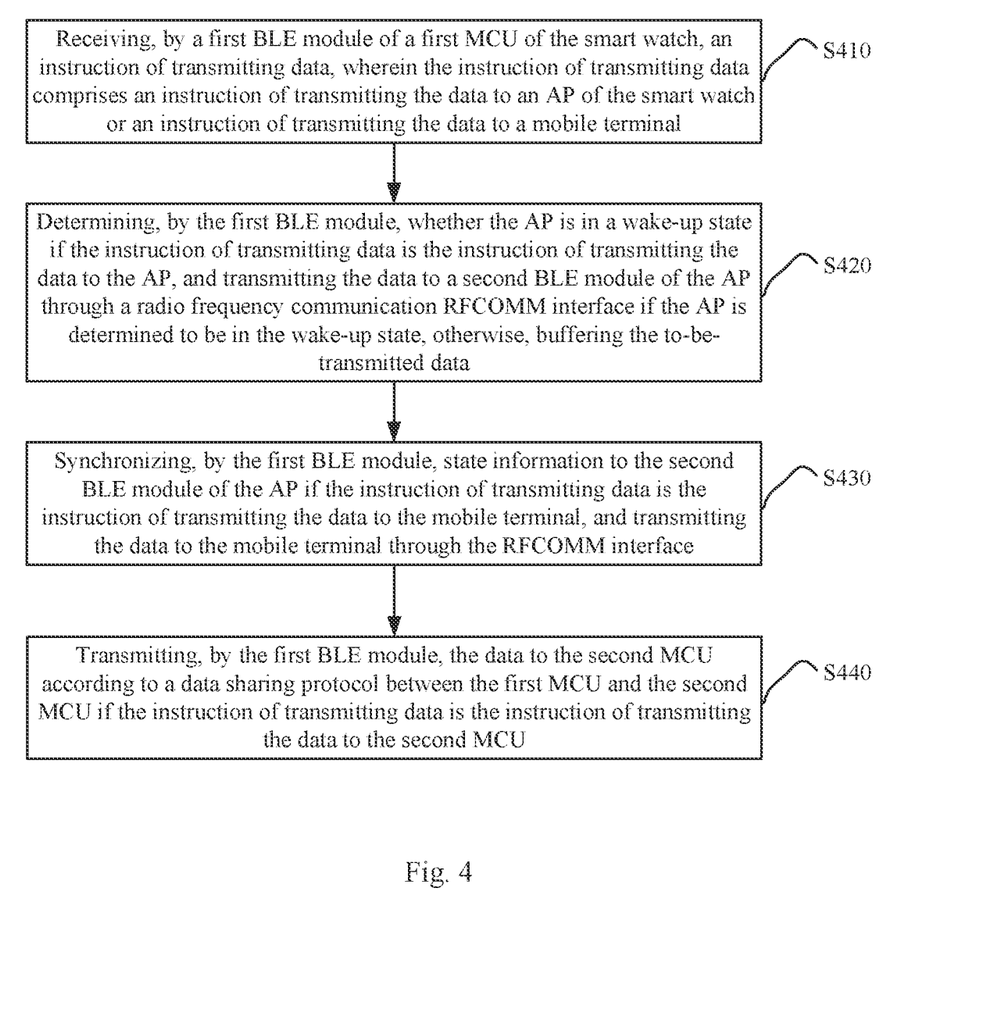
FIG. 4 is another flowchart of the BLE data transmission method of a smart watch according to an embodiment of the present disclosure.

According to the structural block diagram of the smart watch device shown in FIG. 3, the present disclosure provides a BLE data transmission method of a smart watch as shown in FIG. 4, including the following steps:

S410: The first BLE module 21 of the first MCU 11 receives an instruction of transmitting data, where the instruction of transmitting data includes an instruction of transmitting the data to the AP 10 or an instruction of transmitting the data to a mobile terminal.

S420: The first BLE module 21 determines whether the AP 10 is in a wake-up state if the instruction of transmitting data is the instruction of transmitting the data to the AP 10, and transmits the data to the second BLE module 20 of the AP 10 through a RFCOMM interface if the AP is determined to be in the wake-up state, otherwise, buffers the to-be-transmitted data.

S430: The first BLE module 21 synchronizes state information to the second BLE module 20 of the AP 10 if the instruction of transmitting data is the instruction of transmitting the data to the mobile terminal, and transmits the data to the mobile terminal through the RFCOMM interface.

S440: The first BLE module 21 transmits the data to the second MCU 12 according to a data sharing protocol between the first MCU 11 and the second MCU 12 if the instruction of transmitting data is the instruction of transmitting the data to the second MCU In this embodiment, when needing to use the data collected by the first BLE module 21 or needing to send out data through the first BLE module 21, the second MCU 12 interacts with the first MCU 11 by using a custom hardware abstraction layer (HAL) interface.

Optionally, the first BLE module 21 includes a controller module, which is configured to verify the validity of the data before the data is sent through the RFCOMM interface.

Optionally, the first BLE module 21 can encapsulate and parse a data packet; and pack and send the encapsulated data after the AP is woken up.

Optionally, the first BLE module 21 determines whether the AP10 is in the wake-up state according to a notification of a service run by the first MCU 11. The first BLE module 21 and the first MCU 11 each keep a service running. Services can exchange the wake-up state information of the AP 10 or a task instruction.

Optionally, the step in which the first BLE module 21 synchronizes the state information to the second BLE module 20 of the AP 10 includes that: the first BLE module 21 synchronizes the state information to the BLE module 20 of the AP 10 in a pass-through manner through a custom interface provided by a library file. During the synchronization, the first BLE module 21 communicates with the second BLE module 20 directly without waking up the AP 10.

The operation process of the first BLE module 21 in each application scenario is described below with reference to the flowchart.

Figure 5:
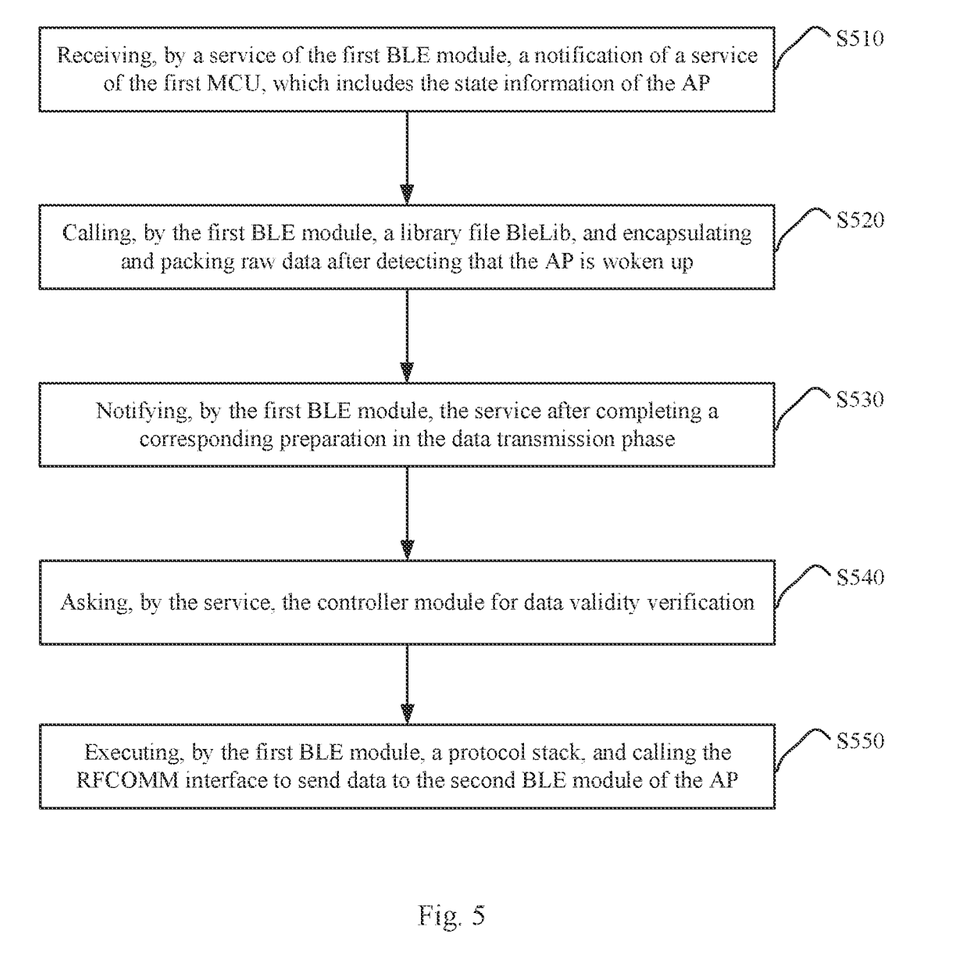
FIG. 5 is a flowchart of exchanging data between a first BLE module and an AP according to an embodiment of the present disclosure.

As shown in FIG. 5, a process of exchanging data between the first BLE module 21 and the AP 10 includes the following steps:

S510: A service 1 of the first BLE module 21 receives a notification, which includes the state information of the AP 10, of a service 2 of the first MCU 11.

S520: The first BLE module 21 calls a library file BleLib, and encapsulates and packs raw data after detecting that the AP 10 is woken up.

S530: The first BLE module 21 notifies the service 1 after completing a corresponding preparation in the data transmission phase.

S540: The service 1 asks the controller module for data validity verification.

S550: The first BLE module 21 executes a protocol stack, and calls the RFCOMM interface to send data to the second BLE module 20 of the AP 10.

Figure 6:
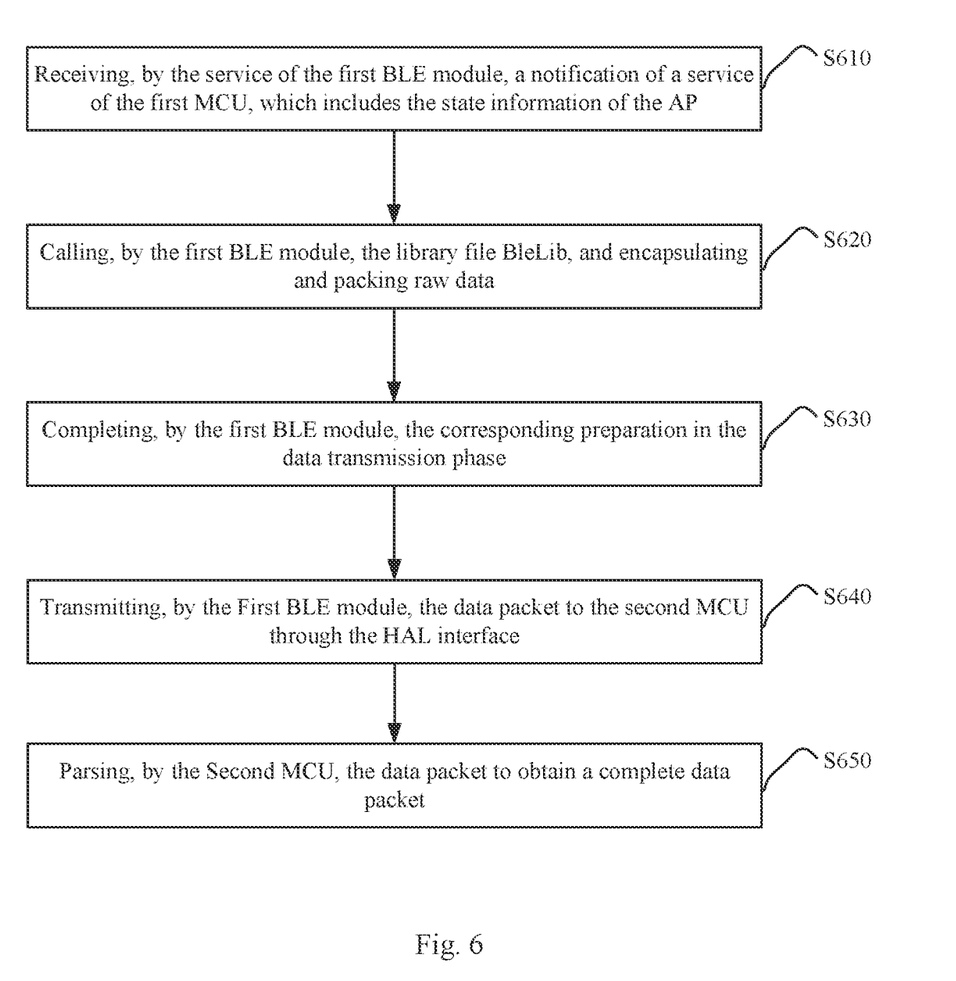
FIG. 6 is a flowchart of exchanging data between the first BLE module and a second MCU according to an embodiment of the present disclosure.

As shown in FIG. 6, a process of exchanging data between the first BLE module 21 and the second MCU 12 includes the following steps:

S610: The service 1 of the first BLE module 21 receives a notification, which includes the state information of the AP 10, of a service 2 of the first MCU 11.

S620: The first BLE module 21 calls the library file BleLib, and encapsulates and packs raw data.

S630: The first BLE module 21 completes the corresponding preparation in the data transmission phase.

S640: The first BLE module 21 transmits the data packet to the second MCU 12 through the HAL interface.

S650: The second MCU 12 parses the data packet to obtain a complete data packet.

Figure 7:
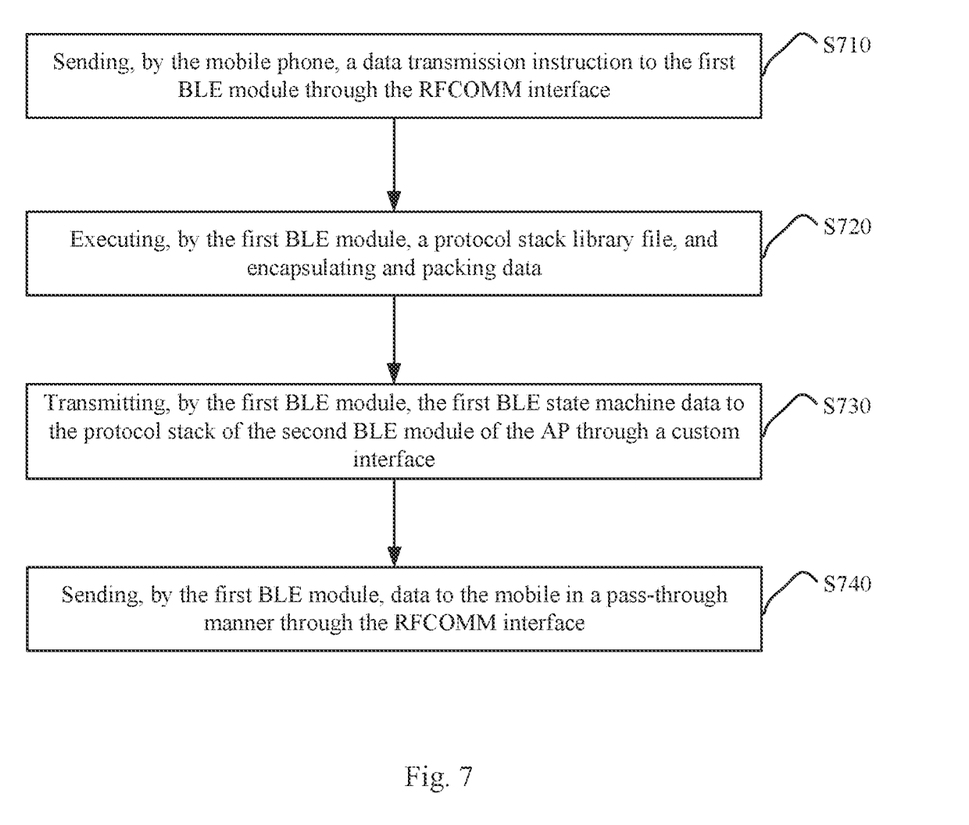
FIG. 7 is a flowchart of exchanging data between the first BLE module and a mobile phone according to an embodiment of the present disclosure.

As shown in FIG. 7, a process of exchanging data between the first BLE module 21 and a mobile phone includes the following steps:

S710: The mobile phone sends a data transmission instruction to the first BLE module 21 through the RFCOMM interface.

S720: The first BLE module 21 executes a protocol stack library file, and encapsulates and packs data.

S730: The first BLE module 21 transmits the first BLE state machine data to the protocol stack of the second BLE module 20 of the AP 10 through a custom interface.

S740: The first BLE module 21 sends data to the mobile in a pass-through manner through the RFCOMM interface.

Figure 8:
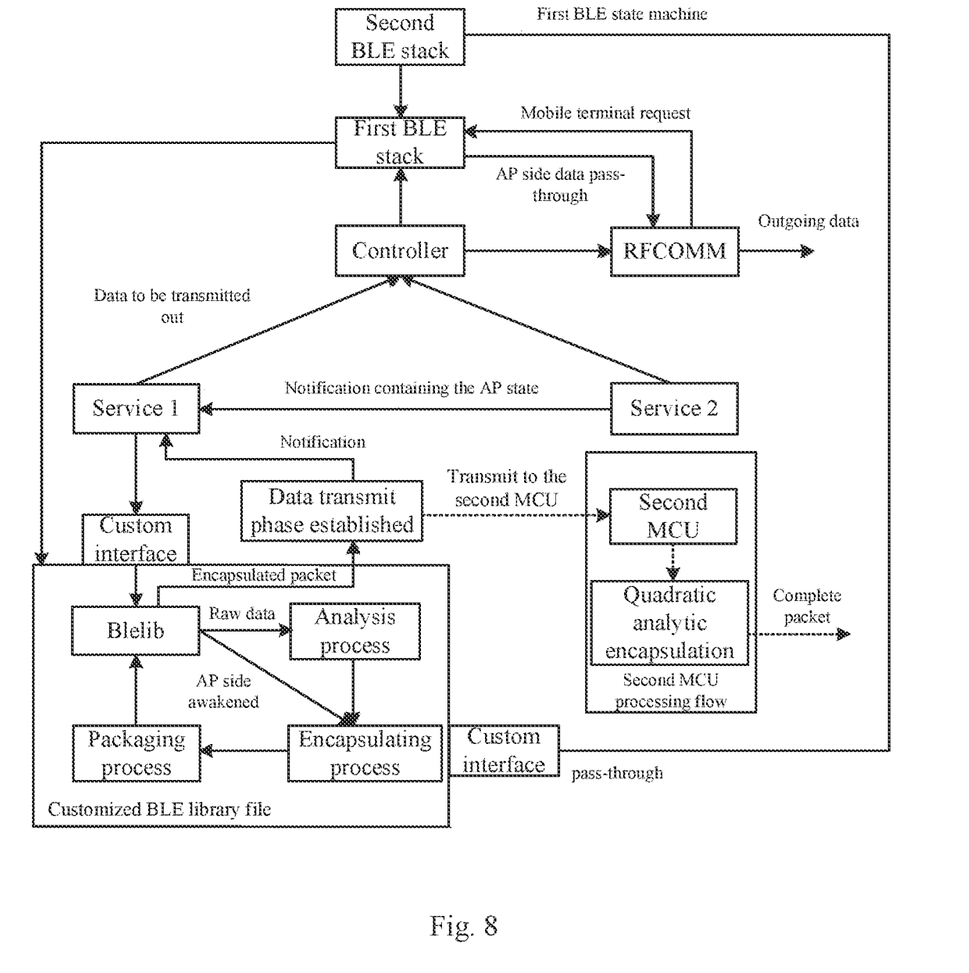
FIG. 8 is a complete operation flowchart of the first BLE module according to an embodiment of the present disclosure.

FIG. 8 shows a complete operation process of the first BLE module 21.

Figure 9:
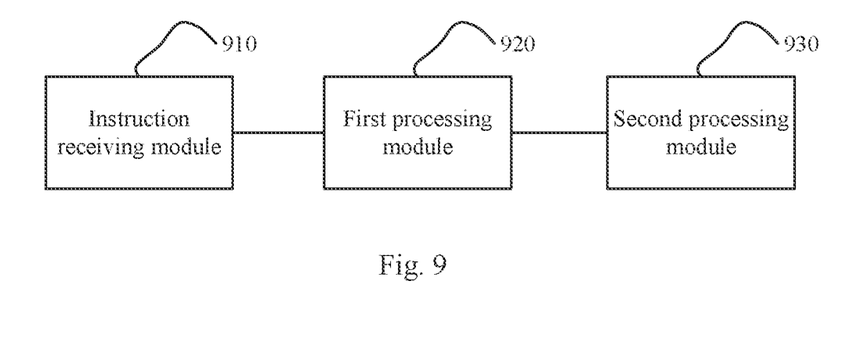
FIG. 9 is a structural block diagram of a BLE module apparatus according to an embodiment of the present disclosure.

With reference to FIG. 9, the present disclosure further shows a BLE module apparatus 900, which is connected to the first MCU of the smart watch and includes:

an instruction receiving module 910, configured to receive an instruction of transmitting data, where the instruction of transmitting data includes an instruction of transmitting the data to an AP or an instruction of transmitting the data to a mobile terminal;

a first processing module 920, configured to determine whether the AP is in a wake-up state when the instruction of transmitting data is the instruction of transmitting the data to the AP, and transmit the data to the AP through a RFCOMM interface if the AP is determined to be in the wake-up state, otherwise, buffer the to-be-transmitted data; and a second processing module 930, configured to synchronize state information to a BLE module of the AP when the instruction of transmitting data is the instruction of transmitting the data to the mobile terminal, and transmit the data to the mobile terminal through the RFCOMM interface.

For specific limitations on the BLE module apparatus, reference may be made to the limitations on the BLE data transmission method of the smart watch and details are not described herein again.

The present disclosure further provides a MCU, including the BLE module apparatus 900.

In the solution provided by the embodiments of the present disclosure, the MCU system is mounted with a BLE chip. In a case that the smart OS sleeps or is shut down, the MCU system has an independent Bluetooth communication capability, for example, sends the received data to the smart OS and another MCU system, to complete the Bluetooth transmission task independently, without waking up the AP, thereby reducing the power consumption of the smart watch, and prolonging the battery life of the smart watch.

The present disclosure further provides a smart watch device, including an AP and the foregoing MCU configured with the BLE module apparatus 900.

Currently, to improve the battery life of smart watches, some manufacturers have used a single-chip MCU solution to save power. The single-chip MCU replace the smart OS to perform some functions of the smart watch. In this solution, the MCU has a heavy load and poor scalability, generally, does not support interaction, and can only decreases, for example, the power consumption of sensors. Moreover, due to the limited functions that a single MCU can support, it is still necessary to frequently wake up the smart OS.

As the power consumption of the smart watches gets more attention, how to minimize the power consumption is a problem to be resolved urgently.

Figure 10:
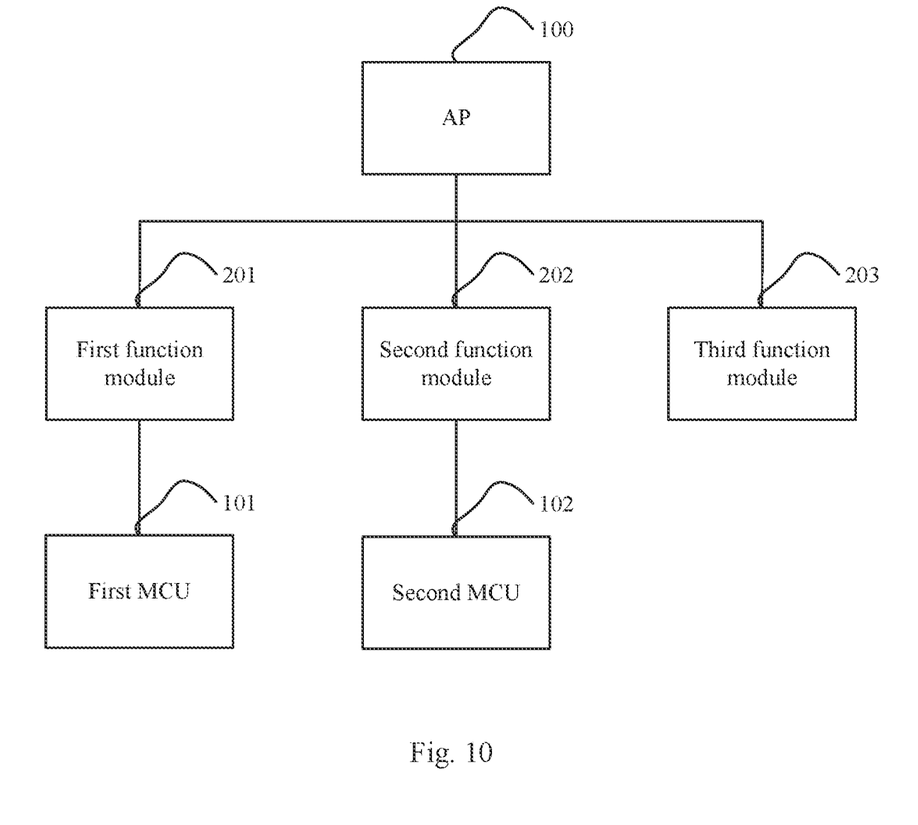
FIG. 10 is a structural block diagram of a smart watch device according to an embodiment of the present disclosure.

FIG. 10 is a structural block diagram of a smart watch device according to the present disclosure, including an AP 100, a first function module 201, a second function module 202, a third function module 203, a first MCU 101 and a second MCU 102. The AP 100 is configured to run the smart OS and drive a plurality of function modules of a smart watch device by using the smart OS. For the ease of description, in the foregoing function modules, a function module that can be driven by the first MCU 101 is defined as the first function module 201. A function module that can be driven by the second MCU 102 is defined as the second function module 202. A function module that can be driven only by the first AP rather than the MCU 101 and the MCU 102 is defined as the third function module 203. When the AP 100 sleeps, the first MCU 101 is configured to drive the first function module 201, and the second MCU 102 is configured to drive the second function module 202. According to an embodiment of the present disclosure, the first MCU 101 operates in a scenario with lower power consumption. The first function module 201 driven by the first MCU 101 includes sensor module(s), battery gauge module(s), voice wake-up monitor module(s), Bluetooth module(s), LCD screen module(s) or the like, and is configured to maintain the basic functions of the smart watch, including waking up the smart OS, checking for time and power through the UI of the LCD screen, receiving a Bluetooth notification, and the like. The second MCU 102 operates in a scenario with high power consumption. The second function module 202 driven by the second MCU 102 includes OLED screen module(s), touch screen module(s), key module(s) used for UI interaction, or the like. A user can perform interactive operations such as touching and tapping a key based on the dial UI provided by the second MCU 102. In addition to the first function module 201 and the second function module 202, the AP can further drive the third function module 203. The third function module 203 can be a relevant calling component such as a speaker. Obviously, in addition to the relevant calling components, there are other arbitrary ways to classify the function modules. For example, the sensor module(s) can be part of the second function module. In another example, near field communication (NFC) module(s) can be part of any one of the first function module 201, the second function module 202, and the third function module 203. In addition, the AP 100, the first MCU 101, and the second MCU 102 can further be all configured with the same function module. For example, the AP 100 is configured with a BLE module alone, and the MCU 101 is also configured with a BLE module alone.

Further, when the AP 100 sleeps, the first MCU 101 drives the Audio in module and the Mic module to receive a voice command; and wakes up the smart OS according to the voice command. For this, the first MCU 101 should have an Inter-IC Sound Bus (I2S)/pulse-code modulation (PCM) interface to decode and transmit speech data.

Further, when the AP 100 sleeps, the first MCU 101 drives the BLE module to acquire the first information; and drives a first display module to display the first information. For example, in a scenario where the smart watch is connected to a mobile phone, after a notification pushed by a specific application on the mobile phone via Bluetooth is received, the notification can be displayed by the first display module.

Optionally, when the AP 100 sleeps, the first MCU 101 drives the NB-IoT module to acquire a second information; and drives the first display module to display the second information. The NB-IoT module and the BLE module have the similar functions, which is not described in detail again.

Optionally, when the AP 100 sleeps, the first MCU 101 is configured to drive the sensor module to acquire sensing data; and drive the first display module to display the sensing data. The sensor may be a heart rate sensor, a blood pressure sensor, a temperature and humidity sensor, and the like.

Further, when the AP 100 is woken up, the first MCU 101 synchronizes the sensor data to the AP 100, and the relevant application of the AP 100 processes the sensor data.

Optionally, when the AP 100 sleeps, the first MCU 101 is configured to drive the battery gauge module to acquire power data; and drive the first display module to display the power data.

According to the foregoing embodiments, under a condition that the AP 100 is not started, a user, by using a MCU consuming lower power in the MCUs, can view content such as battery power, heart rate, blood pressure and Bluetooth notification.

Further, when the second MCU 102 is started, the second MCU 102 can receive data such as battery power, heart rate, blood pressure, and Bluetooth notification that are acquired by the first function module 201 and are transmitted by the first MCU; and drive the second display module to display the data acquired by the first function module 201.

Optionally, when the AP 100 sleeps, the second MCU 102 drives the Touch module to acquire touch information; and drives the second display module to display the response content of the touch information. The second MCU 102 provides a UI on the second display module. The user can view data such as battery power, heart rate, blood pressure, and dial time on the UI. The user can click and slide by using the touch module to control the display content of the UI.

Optionally, when the AP 100 sleeps, the second MCU 102 drives the KEY module to acquire key information; and drives the second display module to display the response content of the key information. For example, the KEY module includes a wake-up key and a page-turn key. The wake-up key is configured to wake up the second MCU, and the page-turn key is configured to turn a page on the UI interface of the second display module.

In the embodiments of the present disclosure, the first display module and the second display module may be a same display module or different display modules, which respectively include a display module with lower power consumption such as a LCD, and a display module with higher power consumption such as an OLED.

Optionally, when the AP 100 sleeps, the second MCU 102 drives a positioning module to acquire position data; and processes the position data and displays a processing result on the second display module. The positioning module may be the Global Positioning System (GPS) or another positioning system such as the BeiDou Navigation Satellite System (BDS). The processing of the position data may be to calculate a distance, coordinates, and the like.

Optionally, after the AP100 is woken up, the first MCU 101 and the second MCU 102 need to synchronize the data generated during the sleep period of the AP 100 to the AP 100 for further processing by various applications of the AP 100.

Optionally, the first MCU 101 and the second MCU 102 may also be MCUs of the same model or MCUs with similar power consumption. Because dual MCUs are used, the application scope of the MCUs can also be expanded and the dependence on APs can be reduced.

The present disclosure is further described in detail with reference to specific embodiments.

Figure 11:
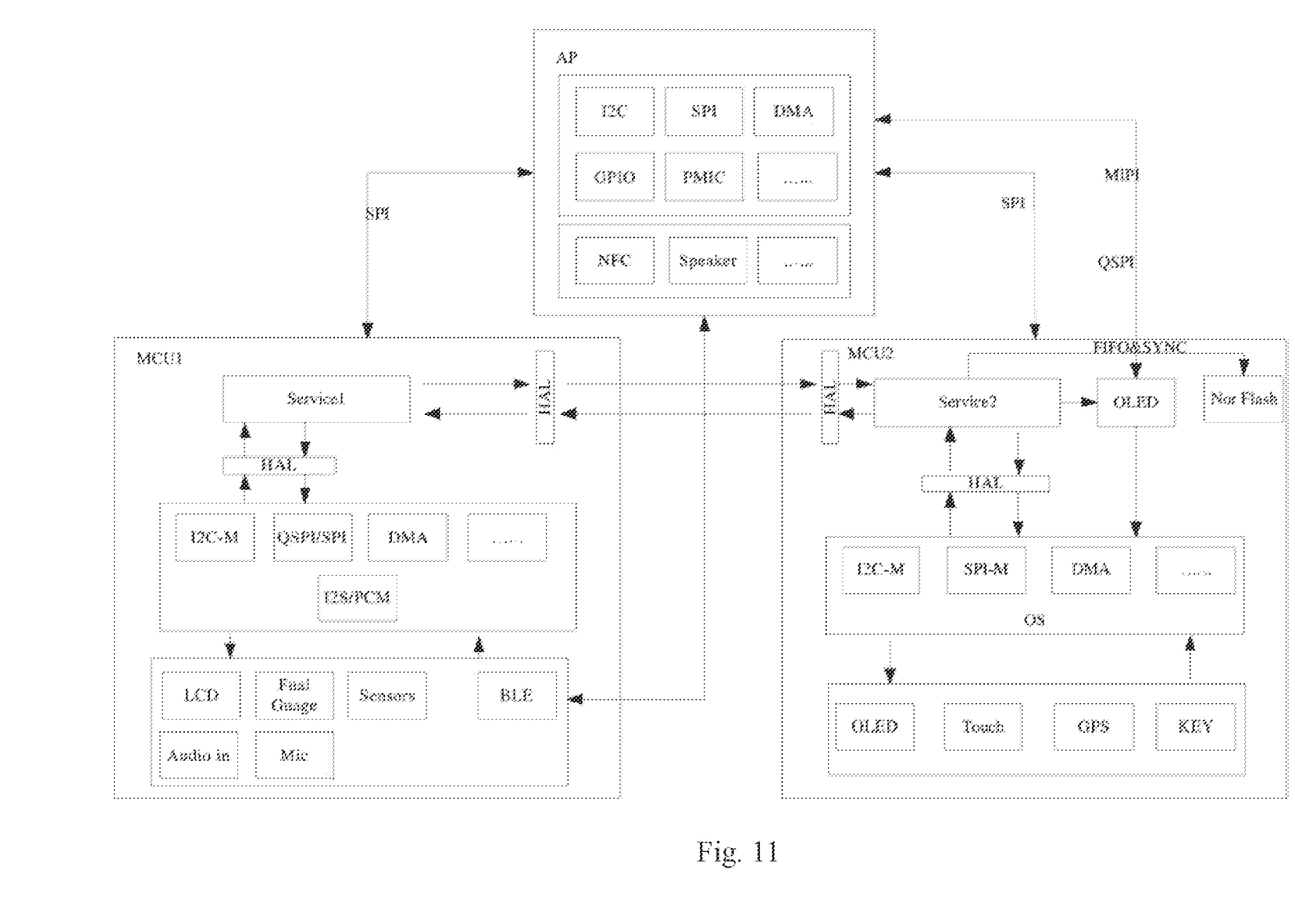
FIG. 11 is a structural block diagram of a smart watch device according to a specific embodiment of the present disclosure.

As shown in FIG. 11, a specific embodiment of the present disclosure provides an engineering design solution for a smart watch, which includes an AP, a MCU 1 and a MCU 2. The AP has a commonly used data interface such as an Inter-Integrated Circuit (I2C), a Serial Peripheral Interface (SPI), a direct memory access (DMA), and a general-purpose input/output (GPIO) as well as a power management IC (PMIC). The MCU 1 has a built-in service 1. The service 1, through the HAL interface, calls I2C-M built in the MCU 1, a QSPI/SPI, a DMI and other interfaces, especially the I2S/PCM interface, to transmit speech data. The MCU 2 has a built-in service 2 and a dedicated non-volatile memory cell Nor Flash. The service 2, through the HAL interface, calls the interfaces such as the I2C-M, SPI-M, and DMA that are built in the MCU 2. The service 2 adopts the first-in first-out & synchronization (FIFO&SYNC) strategy to manage the Nor Flash. Compared with the service 1, the service 2 can implement more complex functions, and can run a simple OS to implement functions such as UI interaction and data access.

When in the wake-up state, the AP can call all function modules such as NFC module(s), speaker module(s), LCD screen module(s), battery gauge module(s), sensor module(s), BLE module(s), Audio in module(s), Mic module(s), the OLED screen module(s), the Touch screen module(s), GPS module(s), and KEY module(s). When the AP sleeps, the MCU 1 can call some function modules such as LCD screen module(s), battery gauge module(s), sensor module(s), BLE module(s), Audio in module(s), and Mic module(s). When the AP sleeps, the MCU 2 can call some function modules such as OLED screen module(s), Touch screen module(s), GPS module(s), and KEY module(s).

The AP communicates with the MCU 1 through the SPI, and synchronizes the data generated by modules such as BLE module(s) and sensor module(s) during the sleep period of the AP. The AP communicates with the MCU 2 through the SPI to synchronize the GPS data generated during the sleep period of the AP.

The AP and the MCU2 share a OLED screen. The AP and the OLED screen are connected through the MIPI or QSPI.

When the AP sleeps, the MCU 1 can be used as the main control chip. The user can view the heart rate, the blood pressure, the Bluetooth notification, the battery power and the like by using the LCD screen. The user can further wake up the MCU 2, to view the content mentioned above, and perform an interactive operation, and obtain a GPS signal. When the user needs to use other functions that are not supported by the MCU 1 and the MCU 2, the AP can be woken up by voice or button.

In the specific solution provided by this specific embodiment, a dual-MCU solution architecture is used. Each MCU operates independently, and can be used as the main control chip. On the premise that the CPU of the smart watch runs the smart OS, a plurality of application scenarios of, for example, hotword waking up, screen displaying, the sensor, the touch screen, the GPS, and the Bluetooth communication, beside the smart OS are implemented only in the MCU, and cover most of the daily application scenarios. In this way, power of the CPU and resources of the smart OS can be consumed less, so that the smart OS can sleep longer to ensure the super long standby time. In the case that the smart watch is used daily, the user can use the smart watch about 5 days, and the standby time of the smart watch can achieve about one month only in the MCU mode.

It should be understood that the various techniques described herein can be implemented in conjunction with hardware or software, or a combination thereof. Thus, the method and device of the present disclosure, or some aspects or parts of the method and device of the present disclosure, may be embedded with a program code (that is, an instruction) in a tangible medium such as a floppy disk, a CD-ROM or a hard driver or any other machine-readable storage medium, where when a program is loaded into a machine, such as a computer and executed by the machine, the machine becomes a device for practicing the present disclosure.

In the case that the program code is executed on a programmable computer, the computing devices generally include a processor, a storage medium (including volatile and non-volatile memories and/or storage elements) readable by the processor, at least one input apparatus, and at least one output apparatus. The memory is configured to store the program code; the processor is configured to perform the method of the present disclosure according to the instruction in the program code stored in the memory.

By way of examples and not limitations, computer-readable media include computer storage media and communication media. Computer-readable media includes computer storage media and communication media. Computer storage media store information such as computer readable instructions, data structures, program modules or other data. Communication media generally embody computer readable instructions, data structures, program modules or other data by using a carrier wave or a data signal modulated by another transmission mechanism and the like, and include any information delivery media. Any combination of the above is also included within the scope of computer-readable media.

It should be understood that, to simplify the present disclosure and assist in understanding one or more of the various disclosed aspects, in the above description of exemplary embodiments of the present disclosure, various features of the present disclosure are sometimes grouped together into a single embodiment, a figure or its description. However, this method of the present disclosure should not be interpreted to reflect an intention that the present disclosure claimed to be protected requires features more than those expressly recited in each claim. Rather, as the following claims reflect, disclosed aspects are fewer than all features of a single embodiment disclosed above. Thus, the claim following a detailed implementation is hereby expressly incorporated into the detailed implementation, where each claim is used as a single embodiment of the present disclosure.

Those skilled in the art should understand that the modules, units or components of the device in the examples disclosed herein may be arranged in the device described in this embodiment, or may be alternatively positioned in one or more devices different from the device in this example. The modules in the foregoing examples may be combined into one module or further divided into sub-modules.

Those skilled in the art may understand that the modules in the device in the embodiments can be adaptively changed and disposed in one or more devices different from that in the embodiment. The modules, units or components in the embodiments may be combined into one module, unit or component, or may be divided into a plurality of sub-modules, sub-units or sub-components. All features disclosed in this specification (including claims, abstract and accompanying drawings) and any method so disclosed, or all processes or units of the device may be employed in any combination unless at least some of the features and/or processes or elements are mutually exclusive. Unless expressly stated otherwise, each feature disclosed in this specification (including claims, abstract and accompanying drawings) may be replaced by alternative features serving the same, equivalent or similar objective.

Furthermore, those skilled in the art can understand that although some of the embodiments described herein include some features rather than others included in other embodiments. But, combinations of features of different embodiments are intended to be within the scope of the present disclosure and form different embodiments. For example, in the following claims, any of the claimed embodiments may be used in any combination.

Furthermore, some of the described embodiments are described herein as methods or combinations of method elements that can be implemented by a processor of a computer system or by another apparatus performing the function. Thus, a processor having necessary instructions for implementing the method or the method element forms an apparatus for implementing the method or the method element. Furthermore, for example, an element described herein of an apparatus embodiment is an apparatus, which is configured to perform the function performed by the element for implementing the present disclosure.

As used herein, unless stated otherwise, the use of the ordinal numbers "first," "second," "third," and the like to describe common objects merely refers to different examples of similar objects, and is not intended to imply that the objects described in this way must have a given order in aspects such as time, a space and a sequence, or in any other way.

Although, the present disclosure is described in terms of a limited quantity of embodiments, based on the above description, those skilled in the art should understand, that other embodiments are conceivable within the scope of the present disclosure described herein. Furthermore, it should be noted that the language used in this specification is principally selected for readability and teaching purposes, and is not selected for explaining or defining the subject of the present disclosure. Accordingly, many modifications and variations are apparent to those skilled in the art without departing from the scope and spirit of the appended claims. The disclosures in the present disclosure are intended to be illustrative, not restrictive, with regard to the scope of the present disclosure, which is defined by the appended claims.

The invention claimed is:

1. A Bluetooth Low Energy (BLE) data transmission method for a smart watch, comprising:
   receiving, by a first BLE module of a first micro-controller unit (MCU) of the smart watch, an instruction of transmitting data, wherein the instruction of transmitting data comprises an instruction of transmitting the data to an application processor (AP) of the smart watch or an instruction of transmitting the data to a mobile terminal;
   determining, by the first BLE module, whether the AP is in a wake-up state if the instruction of transmitting data is the instruction of transmitting the data to the AP, and transmitting the data to a second BLE module of the AP through a radio frequency communication RFCOMM interface if the AP is determined to be in the wake-up state, otherwise, buffering the to-be-transmitted data; and
   synchronizing, by the first BLE module, state information to the second BLE module of the AP if the instruction of transmitting data is the instruction of transmitting the data to the mobile terminal, and transmitting the data to the mobile terminal through the RFCOMM interface.

2. The method according to claim 1, wherein the instruction of transmitting data further comprises an instruction of transmitting the data to a second MCU of the smart watch; and
   the method further comprises:
      transmitting, by the first BLE module, the data to the second MCU according to a data sharing protocol between the first MCU and the second MCU if the instruction of transmitting data is the instruction of transmitting the data to the second MCU.

3. The method according to claim 1, further comprising:
   verifying, by the first BLE module, validity of the data before transmitting the data through the RFCOMM interface.

4. The method according to claim 1, further comprising:
   encapsulating or parsing, by the first BLE module, the transmitted data.

5. The method according to claim 1, wherein the determining, by the first BLE module, whether the AP is in a wake-up state comprises:
   determining, by the first BLE module, whether the AP is in the wake-up state according to a notification of a service run by the first MCU.

6. The method according to claim 1, wherein the synchronizing, by the first BLE module, state information to the second BLE module of the AP comprises:
   synchronizing, by the first BLE module, the state information to the second BLE module of the AP in a pass-through manner through a custom interface provided by a library file.

7. A BLE module apparatus, connected to a first MCU of a smart watch, and comprising:
   an instruction receiving module, configured to receive an instruction of transmitting data, wherein the instruction of transmitting data comprises an instruction of transmitting the data to an AP of the smart watch or an instruction of transmitting the data to a mobile terminal;
   a first processing module, configured to determine whether the AP is in a wake-up state when the instruction of transmitting data is the instruction of transmitting the data to the AP, and transmit the data to the AP through a RFCOMM interface if the AP is determined to be in the wake-up state, otherwise, buffer the to-be-transmitted data; and
   a second processing module, configured to synchronize state information to a BLE module of the AP when the instruction of transmitting data is the instruction of transmitting the data to the mobile terminal, and transmit the data to the mobile terminal through the RFCOMM interface.

8. The apparatus according to claim 7, further comprising:
   a third processing module, configured to transmit the data to a second MCU of the smart watch through a data sharing protocol between the first MCU and the second MCU when the instruction of transmitting data is the instruction of transmitting the data to the second MCU.

* * * * *